J. W. & W. Z. W. Chapman,
Mounting Artificial Teeth.
Nº 37,809.      Patented Mar. 3, 1863.
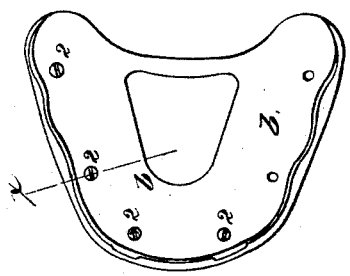
 
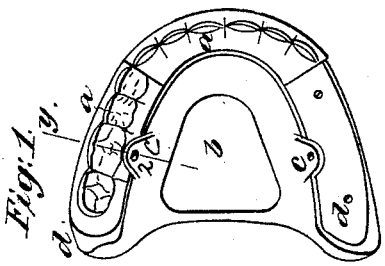
Witnesses:
Lemuel W. Serrell
Thos. Geo. Harold
Inventors:
J. Winslow Chapman,
Wm. Z. W. Chapman

UNITED STATES PATENT OFFICE.

J. WINSLOW CHAPMAN AND WILLIAM Z. W. CHAPMAN, OF NEW YORK, N. Y.

IMPROVEMENT IN SETTING ARTIFICIAL TEETH.

Specification forming part of Letters Patent No. 37,809, dated March 3, 1863.

*To all whom it may concern:*

Be it known that we, J. WINSLOW CHAPMAN and WILLIAM Z. W. CHAPMAN, of the city, county, and State of New York, have made certain new and useful Improvements in Setting Artificial Teeth; and we do hereby declare and ascertain the same, referring to the accompanying drawings, in which—

Figure 1 is a plan of the base-plate, &c., showing the side upon which the teeth are affixed. Fig. 2 is a plan of the opposite surface, which rests against and fits the gums. Fig. 3 is a section on the line $x$ of Fig. 2. Fig. 4 is a like section on the line $y$, Fig. 1.

The same letters of reference are used on like parts in all the figures.

In properly setting or mounting artificial teeth many difficulties arise in any of the numerous modes heretofore in use. The construction is complete, involving great accuracy of manufacture, with varied and delicate materials. For instance, the teeth must be made to appear natural, they must articulate properly with those opposite to them, whether artificial or natural, and whatever their irregularities, and the plate or surface upon which the artificial teeth are mounted, and which rests on the gums, must exactly fit the irregularities thereof. To fit each tooth at the base and crown, as is usually done, is a work of labor and difficulty, manufactured as they usually are for sale to the profession in single teeth or blocks.

The object of our invention is to obviate most of the difficulties thus encountered by the professional dentist in fitting teeth purchased of the manufacturer, or repairing sets thereof in a cheap and expeditious manner, while at the same time we attain an easy mode of removing, changing, and repairing the teeth after they are fitted originally.

We are aware that there are many devices for mounting teeth, and some of them heretofore essayed are employed by us in our new system, and these, of course, we do not claim, except so far as they are combined to form our plan, which is as follows: First, we so construct and combine the parts as to manufacture and complete each before uniting them, by which each part can be made in the cheapest and most convenient way, without reference to the others; secondly, we unite the several parts in a way to harmonize the peculiarities and irregularities of the principal parts; thirdly, we so unite the several parts as to be enabled to readily remove the one from the other for repair or adjustment when either becomes injured or deranged from accident or wear.

The construction is as follows: A cast is taken of the gums in any of the usual ways well known to dentists. Upon this there is a pattern-plate, formed of any soft metal, or other suitable material of the size and thickness of which we intend to make the casting, hereinafter described. We then take our teeth in one or more blocks, or separate, and after coating the soft-metal plate above described with soft wax, we carefully adjust the teeth thereon, so as to perfectly articulate with the opposite teeth, building up or depressing the wax until this is effected. When this has been satisfactorily done, and the exact position of the teeth are determined, we carefully remove all the wax or other plastic material used for the purpose of adjustment that remains outside of the line of the base of the teeth, and smooth the surface thereof so as to form a wall connecting the base of the teeth and the plate. We then take a cast in plaster upon the teeth and plate on the interior and exterior side of the arch, after which the plate is removed from the teeth and plaster-of-paris or other suitable material of which the cast is made, together with the wax before named, and a cast is taken of the concave surface of the base of the teeth and surrounding plaster-cast above named. From this a counter-cast is taken, which forms one-half of a mold for casting the "saddle-plate," hereinafter described. The other half or section of the mold is made by placing the soft-metal plate first named upon the first section or half of the mold, and then forming the second section of the mold thereon. The two sections of the mold thus formed, which are readily made by any person competently instructed in like manufactures, are put together, and a casting of metal or other proper material is cast therefrom, the metal, which we prefer for its lightness and other valuable qualities, being aluminium; but hard rubber, as well as some other substances, might be employed. The casting thus made presents on its concave surface an exact counterpart of the gum, and on its convex surface all the irregularities of the base of the teeth that are to fit it; but in the process of casting, &c., it may be found that the plate, from contraction or other cause, requires to be put upon the original die for perfect adjustment, a process too well known to dentists to need particular description here. This plate we denominate a "saddle-plate," and it may be of the full size used to mount teeth upon, as shown in Figs. 1 and 2, *b b*, or it may only cover a space about equal to the base of the teeth, as at *d*. (See Figs. 3, 4.) In the former case it may be employed alone without any other plate. In the latter another plate is used as a base-plate.

There is also another style of work to which our invention is applicable, known as "Allen's," or the continuous gum-work, in which there is a plate of platinum made of the general configuration of the gum upon which the teeth, artificial gums, &c., are affixed in the enameling-furnace. This style of work has been objected to by some persons on account of the metal required to be used next to the gums instead of gold, and it is impossible to fit the gums so accurately where the plate is so highly heated as in this process, as, from the fragile nature of the enamel the plate cannot be readjusted to the mold or cast if it is warped by the process after it is enameled. In this work we properly form the plate, and then affix the teeth thereon (on the plan of Allen.) To the concave surface of this plate a base-plate of gold or other suitable substance is fitted to the gums, by which we avail ourselves of this style of work without the many difficulties that make it so objectionable in the old way.

The parts being constructed substantially as above set forth, they are attached as follows: When the teeth are being manufactured, a platinum nut, or its equivalent, is introduced into each, or if they are made in blocks, then the nuts are inserted at proper intervals, as designated by the holes in the plate *b*, Fig. 1, where a block of teeth is shown removed, (in this case there are three blocks for the whole arch, but the arch can be made in one or more blocks, or of single teeth,) and there may be a sufficient number of screws and nuts used for each block, according to the judgment of the manufacturer. The nuts need only be exposed at the base of the teeth, as shown at 1, Fig. 3, and a screw, 2, is inserted through the base-plate, saddle, &c., into said nut, by which they are secured fast together.

It is obvious the screw-heads must be countersunk so as to present no projection upon the inner surface of the base-plate to come in contact with the gums.

In addition to this fastening it may be sometimes deemed advisable to project from the base-plate metal projections, called "backings" or "stay-plates," *c*, which are clearly seen in Figs. 1, 4. These backings are affixed to the teeth by screws and nuts, as seen at Fig. 4.

Having thus fully described our improved method of setting teeth, what we claim therein as new, and for which we desire Letters Patent, is—

1. The construction and employment of a plate of metal or other suitable substance, as herein described, between the teeth and the gums, in the manner and for the purposes set forth, detached from and independent of said teeth, said plate conforming to the irregularities of the base of the teeth and the surface of the gums, substantially as herein specified.

2. Uniting the base or saddle plate with the teeth, as and for the purposes set forth, so that said plate and teeth can be readily separated for repairs or otherwise, as herein described.

J. WINSLOW CHAPMAN.
WM. Z. W. CHAPMAN.

Witnesses to the signature of J. W. Chapman:
ZENAS D. BASSET,
HORACE S. BASSET.

Witnesses to the signature of W. Z. W Chapman:
JAMES F. RUGGLES,
EDWIN M. FELT.